(12) United States Patent
Jaradi et al.

(10) Patent No.: US 12,534,044 B2
(45) Date of Patent: Jan. 27, 2026

(54) LOAD-LIMITING SEATBELT RETRACTOR

(71) Applicant: Ford Global Technologies, LLC, Dearborn, MI (US)

(72) Inventors: Dean M. Jaradi, Macomb, MI (US); Mohammad Omar Faruque, Ann Arbor, MI (US); S.M. Iskander Farooq, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 291 days.

(21) Appl. No.: 18/313,593

(22) Filed: May 8, 2023

(65) Prior Publication Data
US 2024/0375607 A1    Nov. 14, 2024

(51) Int. Cl.
*B60R 22/34*  (2006.01)
(52) U.S. Cl.
CPC ................ *B60R 22/3413* (2013.01)
(58) Field of Classification Search
CPC ....... B60R 22/341; B60R 22/41; B60R 22/44; B60R 22/4676; B60R 2022/444
USPC ............................................. 242/379, 379.1
See application file for complete search history.

(56) References Cited

U.S. PATENT DOCUMENTS

| | | | |
|---|---|---|---|
| 5,967,442 A * | 10/1999 | Wier | B60R 22/3413 280/805 |
| 6,105,893 A | 8/2000 | Schnidt et al. | |
| 6,336,664 B1 * | 1/2002 | Roder | B60R 22/1958 297/480 |
| 9,555,766 B2 | 1/2017 | Yamamoto | |
| 10,369,962 B2 | 8/2019 | Faruque et al. | |
| 11,840,194 B2 * | 12/2023 | Calik | B60R 22/40 |
| 2004/0108155 A1 * | 6/2004 | Mori | B60R 22/44 280/806 |
| 2006/0214043 A1 | 9/2006 | Nomura | |
| 2017/0341625 A1 * | 11/2017 | Jaradi | B60R 22/38 |
| 2019/0092276 A1 * | 3/2019 | Takamatsu | B60R 22/405 |

FOREIGN PATENT DOCUMENTS

| | | |
|---|---|---|
| CN | 113183915 A | 7/2021 |
| JP | 2006264397 A | 10/2006 |
| WO | 2008149698 A1 | 12/2008 |

* cited by examiner

*Primary Examiner* — Anna M Momper
*Assistant Examiner* — Ermia E. Melika
(74) *Attorney, Agent, or Firm* — Frank A. MacKenzie; Brooks Kushman P.C.

(57) ABSTRACT

A vehicle including a seatbelt retractor having a frame and a spool. The spool has a first end and a second end each rotatably supported by the frame. The spool is elongated along an axis from the first end to the second end. The seatbelt retractor includes a slider slidably engaged with the frame. The slider is slidable from an undeployed position to a deployed position. The seatbelt retractor includes a post supported by the slider and moveable with the slider between the undeployed position and the deployed position. The post is engaged with the spool in the deployed position and disengaged with the spool in the undeployed position. The seatbelt retractor includes a locking device operatively coupled between the spool and the post to engage the spool with the post.

16 Claims, 7 Drawing Sheets

LOAD-LIMITING SEATBELT RETRACTOR

BACKGROUND

A seatbelt in a vehicle may be equipped with load-limiting features. During certain vehicle impacts, a retractor of the seatbelt may lock webbing of the seatbelt from further extension from the retractor, and load-limiting features may permit some additional limited extension of the webbing when the force exerted on the webbing exceeds a load-limiting threshold. This additional extension of the webbing from the retractor limits the load applied by the webbing to the chest of an occupant, which may limit chest compression. The load-limiting features typically include a torsion bar disposed within a spool of the retractor.

DETAILED DESCRIPTION

A seatbelt retractor includes a frame and a spool. The spool has a first end and a second end each rotatably supported by the frame. The spool is elongated along an axis from the first end to the second end. A slider is slidably engaged with the frame. The slider is slidable from an undeployed position to a deployed position. A post is supported by the slider and is moveable with the slider between the undeployed position and the deployed position. The post is engaged with the spool in the deployed position and is disengaged with the spool in the undeployed position. A locking device is operatively coupled between the spool and the post to engage the spool with the post.

The seatbelt retractor may include a motor between the frame and the slider. The motor is operatively coupled to the slider to move the slider between the deployed position and the undeployed position.

The post may have an end proximate to the slider and fixed relative to the slider.

The seatbelt retractor may include a second post fixed relative to the frame in a position engaged with the spool. The post and the second post may be spaced from each other circumferentially about the axis. The second post has an end proximate to the frame and fixed relative to the frame.

The seatbelt retractor may include a track between the frame and the slider. The slider slides along the track relative to the frame between the deployed position and the undeployed position.

The post may be plastically deformable relative to the frame in the deployed position during rotation of the spool relative to the frame.

The seatbelt retractor may include a gear coaxial with the spool and rotatably supported by the frame. The locking device may be lockable with the gear. The locking device may include an inertia clutch supported by the spool and lockable with the gear. The seatbelt retractor may include teeth on the gear and teeth on the post. The teeth on the post are engaged with the teeth on the gear in the deployed position and disengaged with the teeth on the gear in the undeployed position. The seatbelt retractor may include a second post and teeth on the second post. The second post may be fixed to the frame in a position with the teeth on the second post engaged with the teeth on the gear. The post and the second post may be spaced circumferentially around the gear. The seatbelt retractor may include a motor between the frame and the slider. The motor may be operatively coupled to the slider to move the slider between the deployed position and the undeployed position.

The seatbelt retractor may include a webbing wound around the spool.

The seatbelt retractor may include a spring between the slider and the frame, the spring biasing the slider toward the undeployed position.

With reference to the Figures, wherein like numerals indicate like parts throughout the several views, a vehicle 10 including a seatbelt retractor 12. The seatbelt retractor 12 includes a frame 14 and a spool 16. The spool 16 has a first end 18 and a second end 20 each rotatably supported by the frame 14. The spool 16 is elongated along an axis A1 from the first end 18 to the second end 20. The seatbelt retractor 12 includes a slider 22 slidably engaged with the frame 14. The slider 22 is slidable from an undeployed position to a deployed position. The seatbelt retractor 12 includes a post 24 supported by the slider 22 and moveable with the slider 22 between the undeployed position and the deployed position. The post 24 is engaged with the spool 16 in the deployed position and disengaged with the spool 16 in the undeployed position. The seatbelt retractor 12 includes a locking device 26 operatively coupled between the spool 16 and the post 24 to engage the spool 16 with the post 24.

Since the slider 22 is slidable between the undeployed position to the deployed position, the load-limiting of the seatbelt retractor 12 is adjustable. In some examples, the load-limiting of the seatbelt retractor 12 may be adjustable based on the size of an occupant and/or crash severity, as discussed in examples described further below. Specifically, selective engagement of the post 24 with the spool 16 adjusts the load-limiting characteristics of the seatbelt retractor 12. When the post 24 is engaged with the spool 16 and certain loads are applied to a webbing 28 of the seatbelt assembly 36 (e.g., load applied by the webbing 28 to the spool 16 during certain vehicle impacts that exceeds a predetermined level), the post 24 deforms and provides a discrete amount of regulated payout of the webbing 28 from the seatbelt retractor 12. Since the post 24 is supported by the slider 22, sliding of the slider 22 from the undeployed position to the deployed position engages the post 24 with the spool 16 to increase the load needed to payout the webbing 28 and the sliding of the slider 22 from the deployed position to the undeployed position disengages the post 24 from the spool 16 to decrease the load needed to payout the webbing 28.

The post 24 and the slider 22 are components of a retractable-post assembly 30, as described further below. In some examples, including the example shown in the Figures, the seatbelt retractor 12 may include more than one retractable-post assembly 30. In such examples, the retractable-post assemblies 30 may be independently moveable relative between the deployed position and the undeployed position to adjust the load-limiting characteristics of the seatbelt retractor 12. The seatbelt retractor 12 may include a fixed-post assembly 32 engaged with the spool 16, as described further below. In some examples, including the example shown in the Figures, the seatbelt retractor 12 may include more than one fixed-post assembly 32. Each fixed-post assembly 32 includes a post 24. Common numerals are used to identify common features of the retractable-post assemblies 30 and the fixed-post assemblies 32. Numerical adjectives such as "first," "second," "third," and "fourth" are used as identifiers and do not indicate order or importance.

Figure 1:
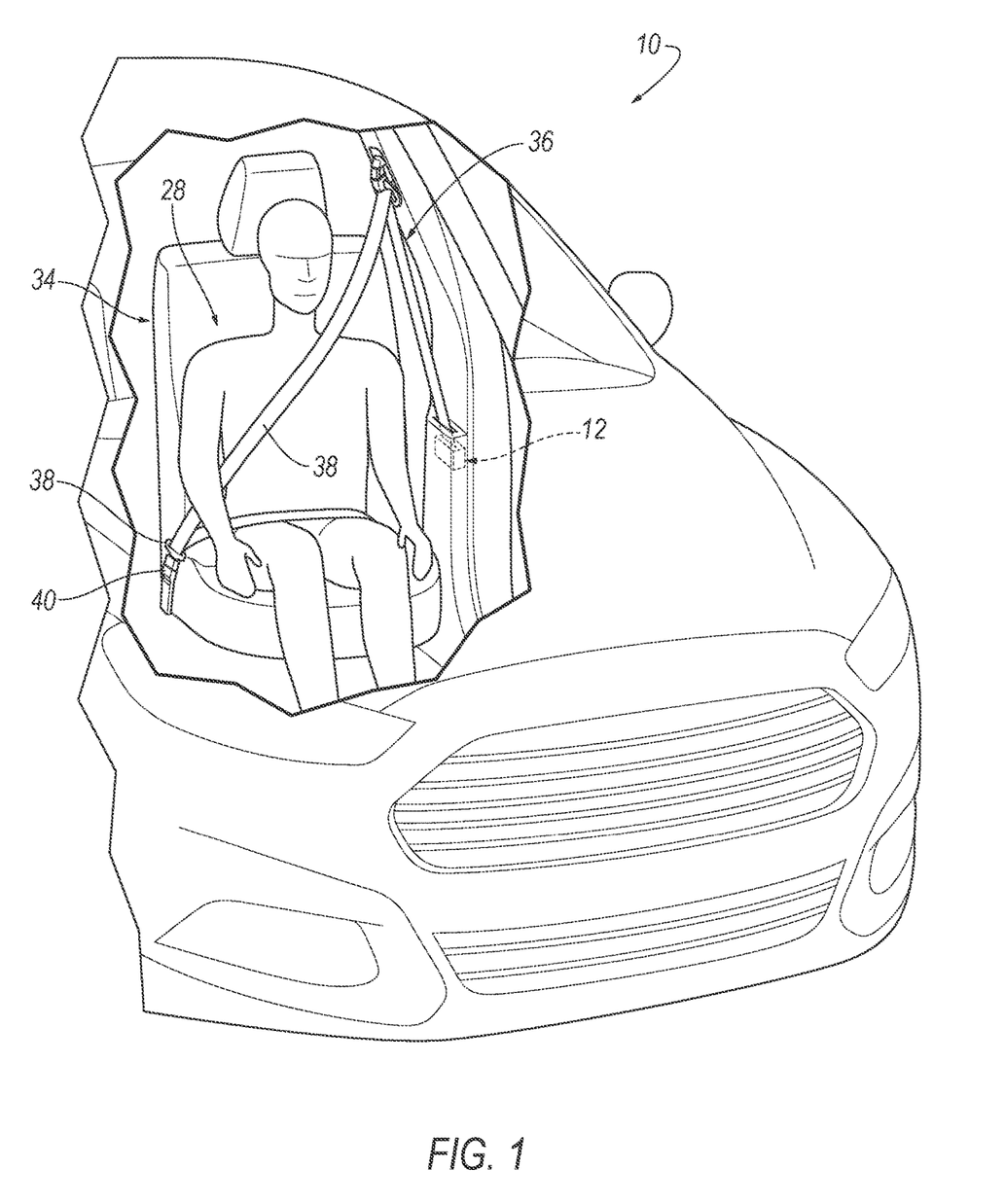
FIG. 1 is a perspective view of a vehicle including a seatbelt assembly.

With reference to FIG. 1, the vehicle 10 may be any suitable type of ground vehicle, e.g., a passenger or commercial automobile such as a sedan, a coupe, a truck, a sport utility, a crossover, a van, a minivan, a taxi, a bus, etc. Operations, systems, and methods described herein should always be implemented and/or performed in accordance with an applicable owner's/user's manual and/or safety guidelines.

The vehicle 10 includes a vehicle frame (not numbered) and a vehicle body (not numbered). The vehicle body may be of unitary construction, in which the vehicle frame is unitary with the body including frame rails, rockers, pillars, roof rails, etc. As another example, the vehicle body and vehicle frame may have a body-on-frame construction (also referred to as a cab-on-frame construction) in which the vehicle body (including rockers, pillars, roof rails, etc.) and vehicle frame are separate components, i.e., are modular, and the body is supported on and affixed to the frame 14. Alternatively, the vehicle frame and vehicle body may have any suitable construction. The vehicle frame and the vehicle body may be of any suitable material, for example, steel, aluminum, and/or fiber-reinforced plastic, etc. The vehicle frame and/or the vehicle body defines a passenger compartment (not numbered) to house occupants of the vehicle 10. The passenger compartment may extend across the vehicle 10, i.e., from one side to the other side of the vehicle 10. The passenger compartment includes a front and a rear.

The vehicle 10 includes one or more seats 34 in the passenger compartment. The seats 34 may be arranged in any suitable manner in the passenger compartment. The seats 34 may be of any suitable type, e.g., a bucket seat, bench seat, etc.

The vehicle 10 includes one or more seatbelt assemblies 36. Specifically, one or more of the seatbelt assemblies 36 includes the seatbelt retractor 12 and the webbing 28 extendable from the seatbelt retractor 12. The vehicle 10 may include any suitable number of seatbelt assemblies 36, for example, one seatbelt assembly 36 for each seat 34.

The seatbelt assembly 36, when fastened, is designed to control the kinematics of the occupant during a vehicle 10 impact or a sudden stop. The seatbelt assembly 36 may include an anchor (not shown) coupled to the webbing 28, and a clip 36 that engages a buckle 38. Each seatbelt assembly 36 may be disposed adjacent to one of the seats 34. The seatbelt assembly 36, when fastened, is designed to control certain kinematics of the occupant during a collision or a sudden stop. The seatbelt assembly 36 may be a three-point harness, meaning that the webbing 28 is attached at three points around the occupant when fastened. The seatbelt assembly 36 may, alternatively, include another arrangement of attachment points.

The webbing 28 may extend continuously from the seatbelt retractor 12 to the anchor. For example, one end of the webbing 28 feeds into the seatbelt retractor 12, and the other end of the webbing 28 is fixed to the anchor. The anchor may, for example, be fixed to the seat 34. As another example, the anchor may be fixed to the vehicle body, e.g., the pillar, the floor, etc. The anchor may be attached to the seat 34 in any suitable manner, e.g., with fasteners. The webbing 28 may be fabric, e.g., polyester. The clip 38 slides freely along the webbing 28 and, when engaged with the buckle 40, divides the webbing 28 into a lap band and a shoulder band.

The seatbelt retractor 12 provides payout and retraction of the webbing 28, e.g., via rotation of the spool 16. As described above, the seatbelt retractor 12 includes the frame 14. The frame 14 supports other components of the seatbelt retractor 12. The frame 14 may include a first plate 42 and a second plate 44 spaced from the first plate 42 along the axis A1 of the spool 16. The frame 14 may be of any suitable size and shape. The frame 14 may be of any suitable material, e.g., plastic, metal, composite, etc. The seatbelt retractor 12 may be supported at any suitable location in the vehicle 10.

The spool 16 is rotatably supported by the frame 14. The first end 18 of the spool 16 is rotatably supported by the frame 14, e.g., the first plate 42. The second end 20 of the spool 16 is rotatably supported by the frame 14, e.g., the second plate 44. The spool 16 is elongated along the axis A1 from the first end 18 to the second end 20. The spool 16 is rotatable about the axis A1. For example, the first end 18 of the spool 16 may be supported in an opening defined by the first plate 42 and the second end 20 may be supported in an opening defined by the second plate 44. In other words, the spool 16 is free to rotate about the axis A1 relative to the first plate 42 and the second plate 44 when the locking device 26 is unlocked.

Figure 2:
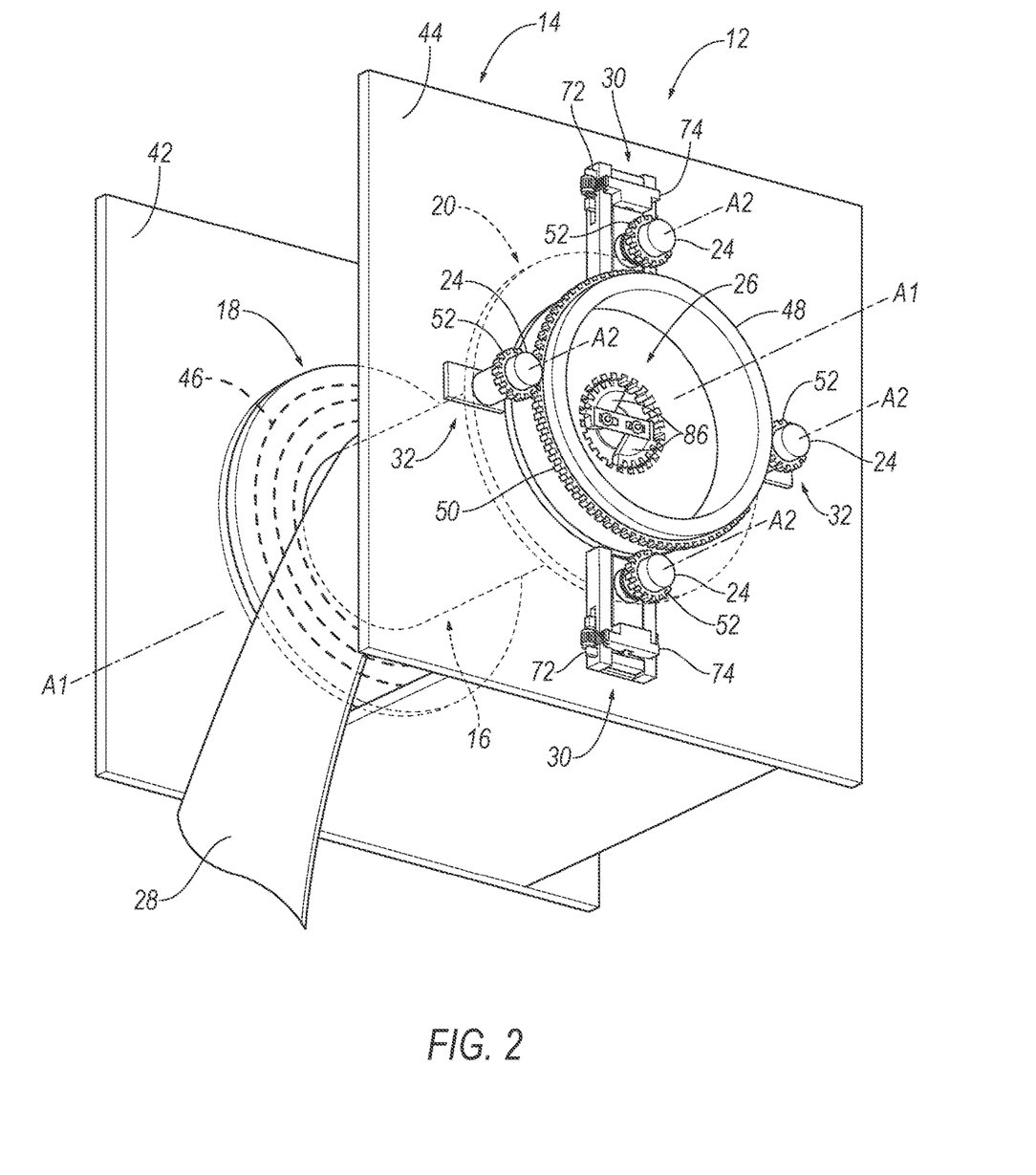
FIG. 2 is a perspective view of a seatbelt retractor of the seatbelt assembly in an unlocked position.
Figure 3:
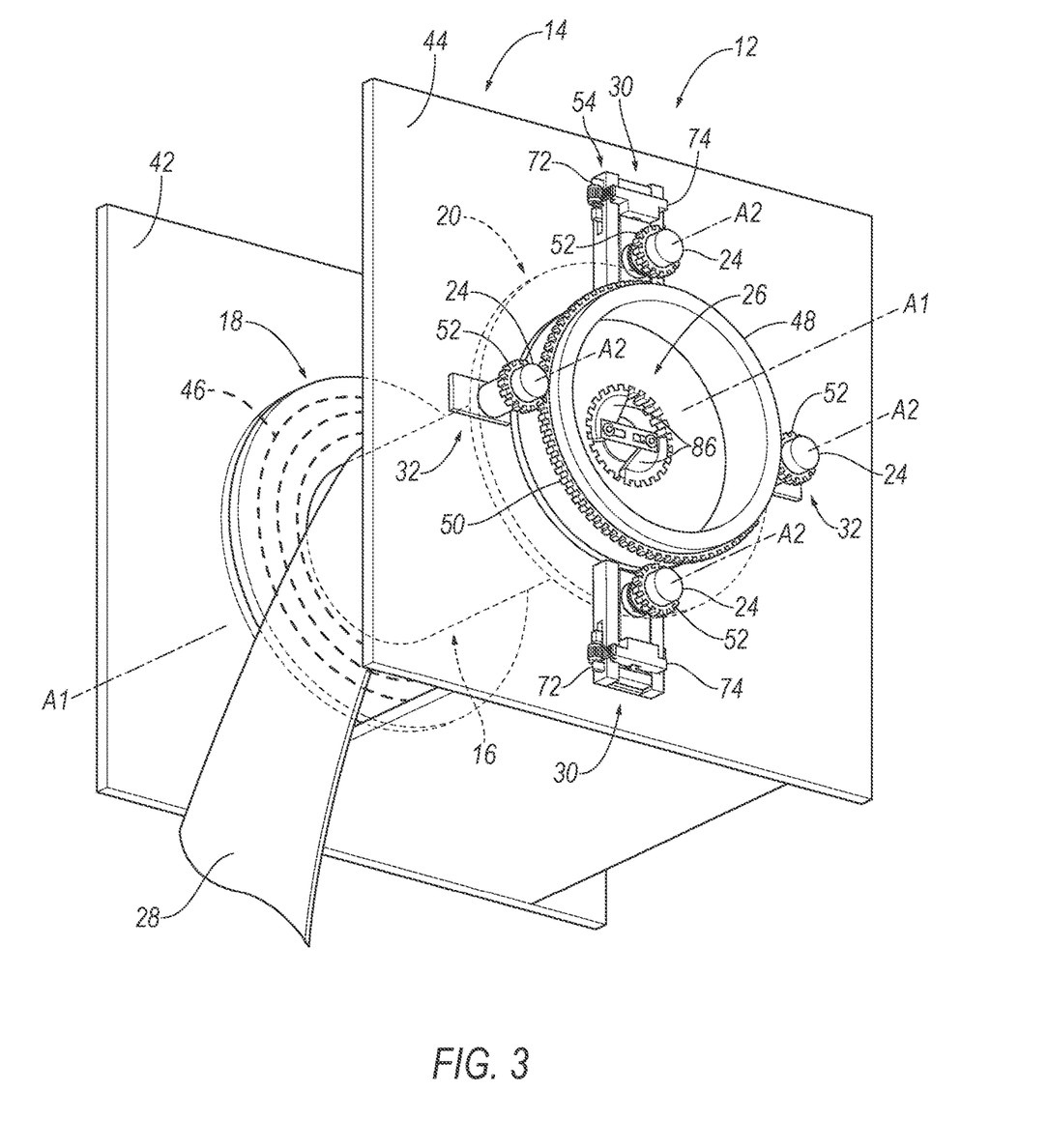
FIG. 3 is a perspective view of the seatbelt retractor in a locked position and with two retractable post assemblies in undeployed positions.

With reference to FIGS. 2 and 3, the spool 16 may include a cylinder and two flanges (not numbered). The cylinder may be elongated along the axis A1 between the first end 18 and the second end 20. As an example, shown in the Figures, the spool 16 includes one flange at the first end 18 of the spool 16 and the other flange at the second end 20 of the spool 16. The cylinder is elongated from one flange to the other flange. The flanges maintain the position of the webbing 28 relative to the spool 16, i.e., the webbing 28 is between the flanges. As shown in the Figures, the flanges extend radially away from the axis A1. The spool 16 is free of having a torsion bar therein. In other words, the seatbelt retractor 12 may not include a conventional torsion bar connecting the locking device 26 to the spool 16.

The webbing 28 is supported by the spool 16. Specifically, the webbing 28 is supported on the cylinder between the two flanges. The cylinder includes a slot elongated along the axis A1. The slot is sized and shaped to receive the webbing 28. The webbing 28 may be in the slot and wound around the spool 16. The webbing 28 may be, for example, fixed to the spool 16 through the slot. The webbing 28 may be fixed to the spool 16 in any suitable manner.

The seatbelt retractor 12 includes a return spring 46. The return spring 46 may be supported by the frame 14 and operatively engaged with the spool 16 to apply torque to the spool 16 relative to the frame 14. The return spring 46 may be coupled to the spool 16 and the frame 14. In the example shown in FIGS. 2 and 3, the return spring 46 is disposed at the first plate 42 of the frame 14 and is engaged with the first end 18 of the spool 16 to retract the webbing 28. The return spring 46 may be loaded in tension or compression when the webbing 28 is fully retracted, and the return spring 46 may be further loaded in either tension or compression when the webbing 28 is extended from the spool 16. When force is exerted on the webbing 28, the return spring 46 may uncoil and the webbing 28 may payout from the spool 16. When the force applied to the webbing 28 is released, no rotational force is exerted on the spool 16 and the return spring 46 exerts a force tending to retract the webbing 28. The return spring 46 may be, for example, a spiral torsion return spring 46 or any other suitable type of return spring 46.

As set forth above, the seatbelt retractor 12 may include at least one retractable-post assembly 30 and at least one fixed-post assembly 32, e.g., two retractable-post assemblies 30 and two fixed-post assemblies 32 as shown in the example in the Figures. The retractable-post assembly 30 in the deployed position and the fixed-post assembly 32 are selectively engageable with the spool 16 with the locking device 26. In other words, the locking device 26 may couple the spool 16 to the retractable-post assembly 30 and the fixed-post assembly 32 to deliver rotation of the spool 16 to the retractable-post assembly 30 and the fixed-post assembly 32 and decouple the spool 16 from the retractable-post assembly 30 and the fixed-post assembly 32 so that the spool 16 is rotatable relative to the retractable-post assembly 30 and the fixed-post assembly 32. Specifically, the locking device 26 in the locked position couples the spool 16 to the posts 24 of the retractable-post assembly 30, if in the deployed position, and the fixed-post assembly 32, and the locking device 26 in the unlocked position decouples the spool 16 with the posts 24 of the retractable-post assembly 30 and the fixed-post assembly 32.

As an example, the seatbelt retractor 12 may include a gear 48 coaxial with the spool 16 and rotatably supported by the frame 14. The spool 16 is rotatable relative to the gear 48 when the locking device 26 is unlocked, as described further below. When the locking device 26 is locked, the locking device 26 couples the spool 16 and the gear 48 so that the spool 16 and the gear 48 rotate together in unison. The locking device 26 is releasably locked to the gear 48, as described further below.

In the example including the gear 48, teeth 50 are on the gear 48 and teeth 52 are on the posts 24. The teeth 52 on the post 24 of the retractable-post assembly 30 are engaged with the teeth 50 on the gear 48 in the deployed position and disengaged with the teeth 50 on the gear 48 in the undeployed position. The teeth 52 on the post 24 of the fixed-post assembly 32 are engaged with the teeth 50 on the gear 48 at all times. The teeth 50 on the gear 48 and the teeth 52 on the posts 24 that are engaged with the gear 48 transfer torque from the spool 16 to the posts 24 when the locking device 26 is locked. The teeth 52 on the post 24 are arranged circumferentially around the post 24 and the teeth 50 on the gear 48 are arranged circumferentially around the gear 48. The teeth 50 on the gear 48 are fixed relative to the gear 48, e.g., via weld, press fit, fastener, spline, unitary construction with the post 24, etc. The teeth 52 on the post 24 are fixed relative to the post 24, e.g., via weld, press fit, fastener, spline, unitary construction with the post 24, etc. The teeth 52 on the post 24 may be spaced from the frame 14 along an axis A2 of the post 24. For example, the teeth 52 on the post 24 may be fixed to distal ends of the post 24. In the example shown in the Figures, the teeth 50 on the gear 48 are equidistantly spaced circumferentially around the entire circumference of the gear 48 and the teeth 52 on the post 24 are equidistantly spaced circumferentially around the entire circumference of the post 24.

When the teeth 52 on the post 24 are engaged with the teeth 50 on the gear 48, the plurality of post 24 deforms to control payout of the webbing 28 when the locking device 26 is at the locked position and sufficient load is applied to the webbing 28. Specifically, when the locking device 26 is in the locked position, rotational force is transmitted from the spool 16 to the gear 48 and from the gear 48 to the post 24. The post 24 is anchored to the frame 14, as described further below, so that when the gear 48 transmits rotational force to the post 24, the post 24 deforms between the gear 48 and the frame 14. This allows for a discrete amount of rotation of the gear 48 and the spool 16, which pays out a discrete amount of the webbing 28 from the spool 16. In the example shown in the Figures, the post 24 is plastically deformable relative to the frame 14. In other words, when subjected to forces sufficient to rotate the gear 48 for payout of the webbing 28, the post 24 experiences torsional, plastic deformation between the gear 48 and the frame 14 as the gear 48 rotates relative to the frame 14. The posts 24 are designed to provide a discrete amount of regulated payout of the webbing 28 and the payout of the webbing 28 is stopped after the discrete amount of regulated payout.

Since the teeth 52 on the post 24 of the fixed-post assembly 32 remain engaged with the teeth 50 on the gear 48, the fixed-post assembly 32 always contributes to the control of payout of the webbing 28 when the locking device 26 is locked. Since the teeth 52 on the post 24 of the retractable-post assembly 30 are selectively engaged with the teeth 50 on the gear 48, the retractable-post assembly 30 contributes to the control of payout of the webbing 28 when the teeth of the post 24 on the retractable-post assembly 30 are engaged with the teeth 50 on the gear 48 and when the locking device 26 is locked. As described further below, the retractable-post assembly 30 is moved to the retracted position for a relatively small occupant and is moved to the deployed position for a relatively large occupant. The post 24 of the fixed-post assembly 32 may be designed to deform at a predetermined level of force on the webbing 28 exerted by a relatively small occupant. Specifically, in examples including multiple fixed-post assemblies 32, the posts 24 of each of the fixed-post assemblies 32 are designed to operate in conjunction with each other to deform at a predetermined-level of force on the webbing 28 exerted by a relatively small occupant. The post 24 of the retractable-post assembly 30 may be designed to deform in conjunction with the post(s) 24 of the fixed-post assembly 32 at a predetermined level of force on the webbing 28 exerted by a relatively large occupant. Specifically, in examples including multiple fixed-post assemblies 32 and multiple retractable-post assemblies 30, the posts 24 of each of the retractable-post assemblies 30 are designed to operate in conjunction with each other and the posts 24 of the fixed-post assemblies 32 to deform at a predetermined-level of force on the webbing 28 exerted by a relatively large occupant. A relatively small occupant may be, for example, a 6-year old crash test dummy or a $5^{th}$ percentile female crash test dummy, as are known to one skilled in the art. A relatively large occupant may be, for example, a $50^{th}$ percentile male crash test dummy, as is known to one skilled in the art.

As set forth above, the seatbelt retractor 12 includes at least one post 24 coupled to the frame 14. In the example including more than one post 24, the posts 24 may be equally spaced about the axis A1. In such examples, pair of the posts 24 may oppose each other about the axis A1. In the example shown in the Figures, the seatbelt retractor 12 includes four posts 24 coupled to the frame 14. Specifically, the posts 24 are anchored to the frame 14. In other words, the post 24 has an end 56 proximate the frame 14 that is immoveable relative to the frame 14 rotationally about the axis A2 of the post 24. Accordingly, when teeth 52 on the post 24 are engaged with teeth 50 on the gear 48 and the locking device 26 is locked, rotational force from the spool 16 and the gear 48 are transmitted to the post 24 and, if the force is of sufficient magnitude, the force deforms the post 24 by twisting the post 24 about the axis A2 between the teeth 52 on the post 24 and the end 56 proximate the frame 14 with the end 56 proximate the frame 14 remaining fixed relative to the frame 14.

As set forth above, the posts 24 of the fixed-post assembly 32 and the retractable-post assembly 30 are anchored to the frame 14, i.e., the end 56 of each post 24 being immoveable relative to the frame 14 rotationally about the axis A2 of the post 24. For example, the end 56 of the post 24 of the fixed-post assembly 32 is fixed relative to the frame 14. In other words, the end 56 of the post 24 of the fixed-post assembly 32 does not move relative to the frame 14. The end 56 of the post 24 of the retractable-post assembly 30 fixed relative to the slider 22. In other words, the end 56 of the post 24 of the retractable-post assembly 30 does not move relative to the slider 22. The slider 22 is retained to the frame 14 with a track 54, as described further below, which allows the slider 22 to translationally slide relative to the frame 14. The track 54 prevents rotation of the slider 22 relative to the frame 14. Accordingly, the end 56 of the post 24 of the retractable-post assembly 30 is anchored to the frame 14 through the slider 22.

As set forth above, the posts 24 are coupled to the frame 14. Specifically, the posts 24 of the fixed-post assemblies 32 are fixed to the frame 14 and the post 24 of the retractable-post assemblies 30 are moveable relative to the frame 14. The posts 24 of the fixed-post assemblies 32 and the posts 24 of the retractable-post assemblies 30 are supported by the frame 14, i.e., the weight of the posts 24 is borne by the frame 14. The posts 24 of the fixed-post assemblies 32 may be supported directly on the frame 14, as shown in the example in the Figures. The posts 24 of the retractable-post assemblies 30 may be supported indirectly on the frame 14, e.g., through the slider 22 and/or other components.

The posts 24 of the retractable-post assembly 30 are selectively moveable toward and away from the gear 48 to engage/disengage the teeth 52 on the post 24 from the teeth 50 on the gear 48, and the posts 24 of the fixed-post assembly 32 are fixed in a position with the teeth 52 on the post 24 engaged with the teeth 50 on the gear 48, as described further below. When the teeth 52 on the post 24 are engaged with teeth 50 on the gear 48, the post 24 rotates relative to the frame 14 to control payout of the webbing 28 when the locking device 26 is locked and sufficient load is applied to the webbing 28 to rotate the posts 24 relative to the frame 14.

In examples including multiple posts 24, the posts 24 may have different torsional strengths relative to each other. The different torsional strengths may be provided for example, posts 24 having different material and/or geometry than each other. Examples of diameter include cross-sectional size, cross-sectional shape, grooves (as shown on the example posts 24 of the retractable-post assembly 30), etc. In examples including multiple fixed-post assemblies 32 and/or multiple retractable-post assemblies 30, each of the posts 24, in conjunction, are designed to provide the desired length of webbing 28 payout at desired predetermined forces on the webbing 28.

The fixed-post assembly 32 includes at least the post 24 and teeth 52 on the post 24. In the example shown in the Figures, the fixed-post assembly 32 includes a mounting plate 58 fixed directly to the end 56 of the post 24, i.e., the end 56 of the post 24 is immovable relative to the mounting plate 58. The end 56 of the post 24 may be fixed to the mounting plate 58 in any suitable fashion, e.g., welding, adhesive, and/or fastener, etc. The mounting plate 58 is fixed to the frame 14, and specifically may be fixed directly to the plate. The mounting plate 58 may be fixed to the frame 14 in any suitable fashion, e.g., welding, adhesive, and/or fastener, etc.

The retractable-post assembly 30 includes the post 24 and a deployment assembly 60. In the example shown in the Figures, the deployment assembly 60 includes the slider 22 and the track 54. In the example in the Figures, the deployment assembly 60 includes an actuator 62 that moves the slider 22 relative to the frame 14.

Figure 4:
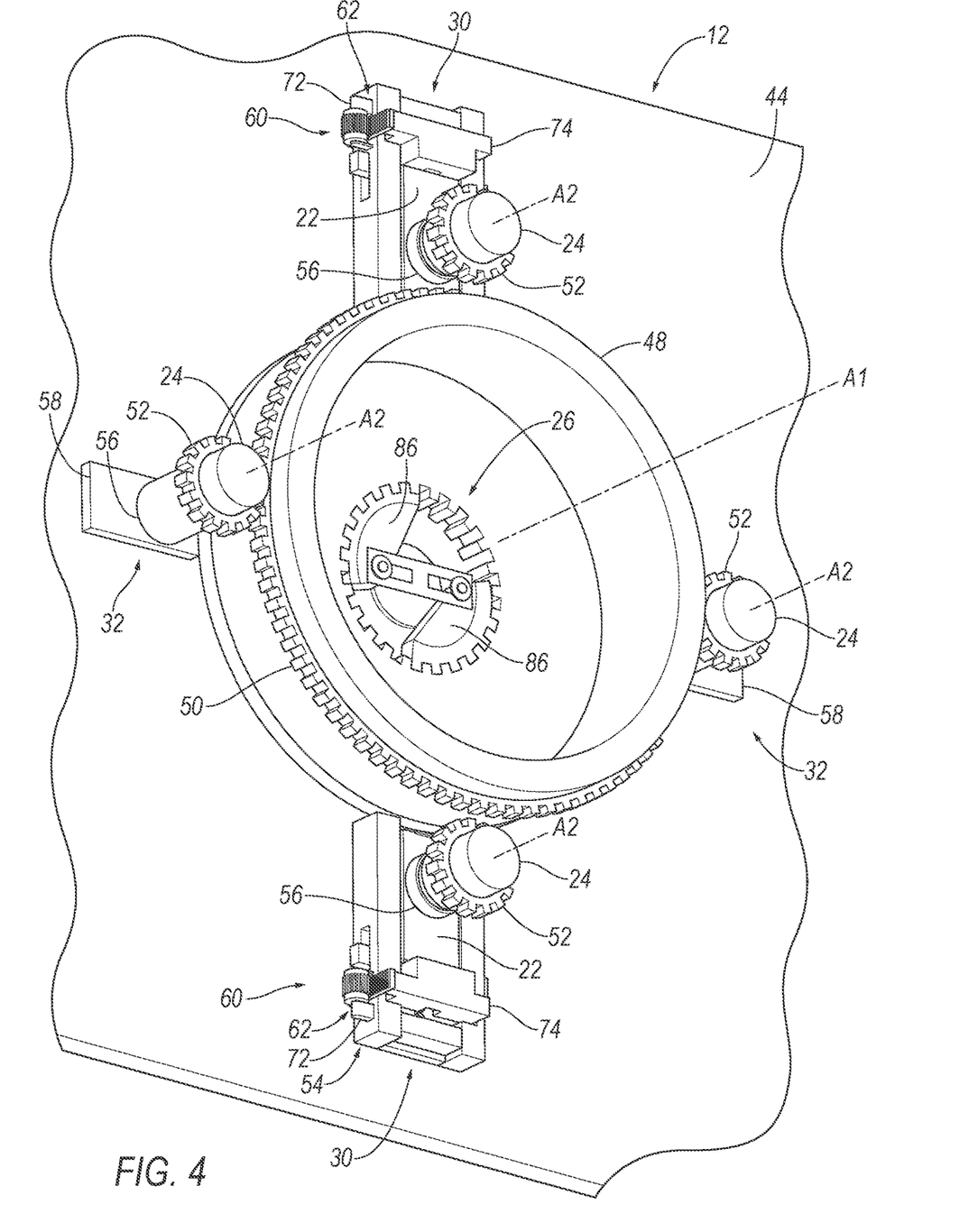
FIG. 4 is a magnified portion of FIG. 3.
Figure 5:
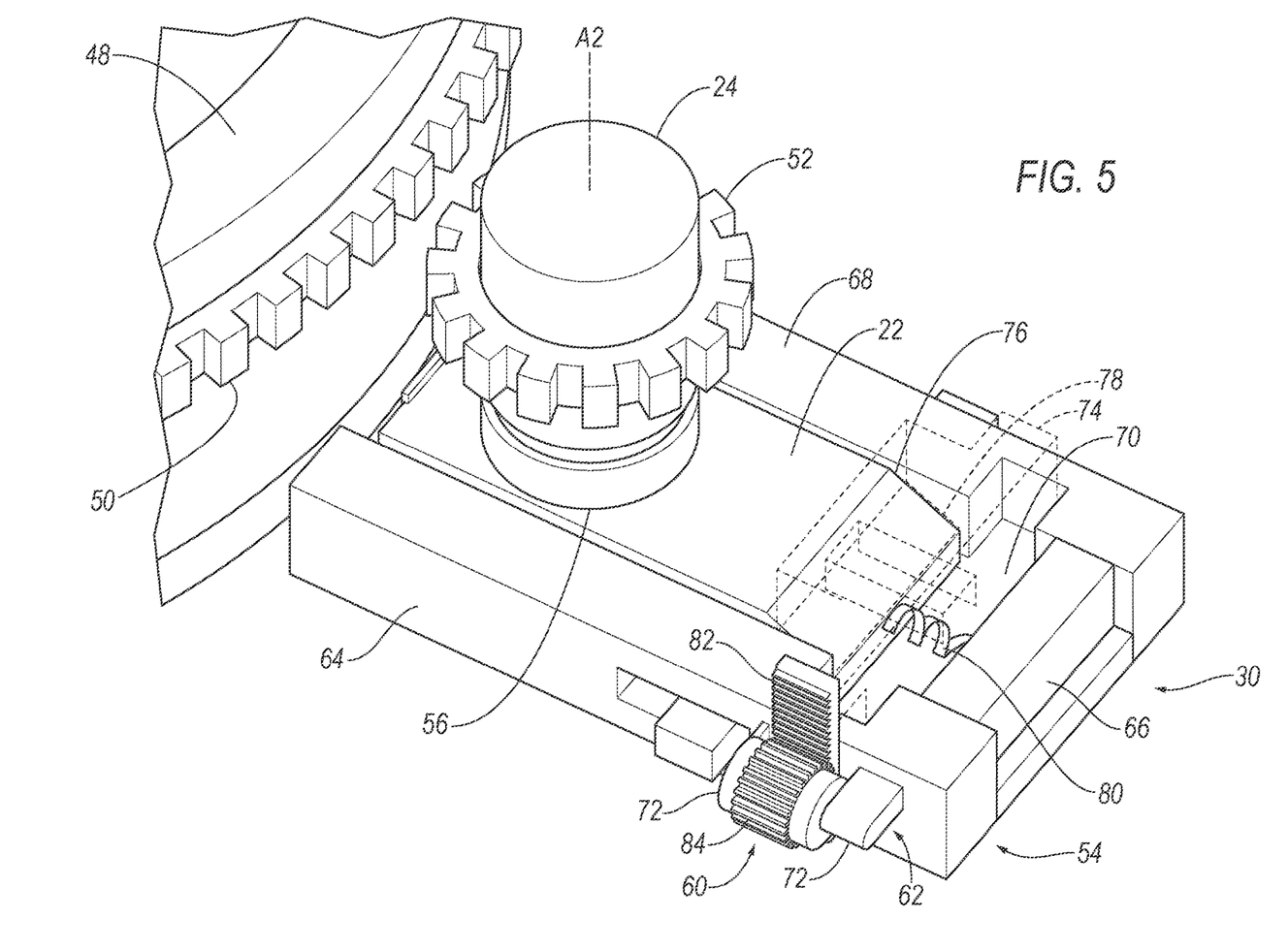
FIG. 5 is a perspective view of the seatbelt tractor in a locked position and with the two retractable post assemblies in deployed positions.
Figure 6:
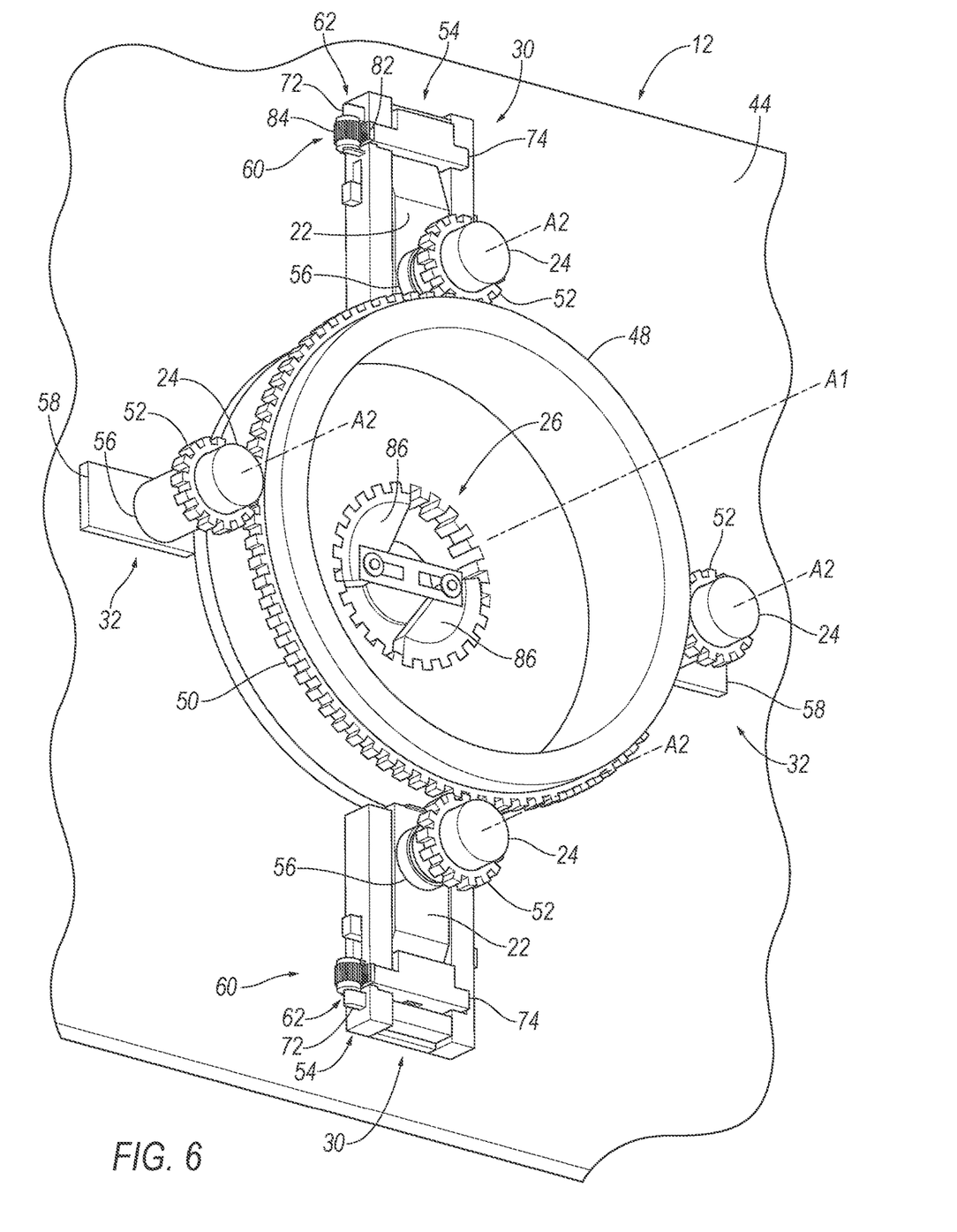
FIG. 6 is a magnified view of a portion of FIG. 5.
Figure 7:
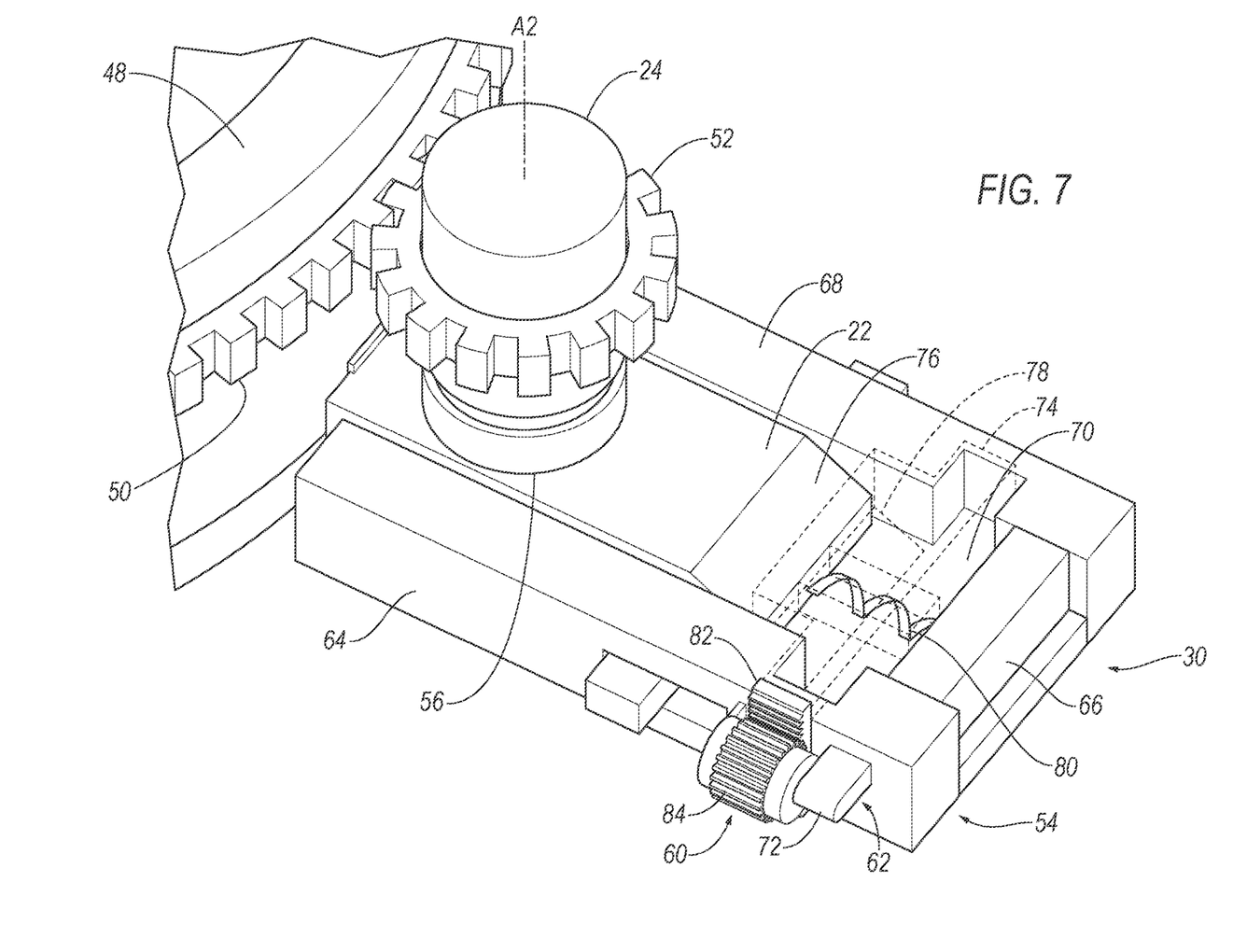
FIG. 7 is a magnified view of one of the retractable post assemblies.

The slider 22 is slidably engaged with the frame 14. Specifically, the slider 22 is slidably engaged with the frame 14 and slidable from the undeployed position to the deployed position. In the example shown in the Figures, the slider 22 is slidable from the undeployed position (FIGS. 2-4) spaced from the gear 48 to the deployed position (FIGS. 5-7) engaged with the gear 48. In other words, the slider 22 slides toward the gear 48 when sliding from the undeployed position to the deployed position and the slider 22 slides away from the gear 48 when sliding from the deployed position to the undeployed position.

The track 54 is between the frame 14 and the slider 22. In the example shown in the Figures the track 54 is fixed to the frame 14 and the slider 22 moves relative to the track 54 and the frame 14 between the undeployed position and the deployed position. The track 54 may be an integrated component the frame 14 or may be formed separately and fixed to the frame 14. In any event, the track 54 is between the frame 14 and the slider 22. The track 54 guides movement of the slider 22 along the track 54 relative to the frame 14 between the deployed position and the undeployed position. The track 54 restricts movement of the slider 22 relative to the frame 14 to linear movement. The slider 22 translates relative to the track 54 and the frame 14 between the deployed position and the undeployed position.

The track 54 includes a first wall 64, a second wall 66 and a third wall 68. The track 54 terminates at the first wall 64, the second wall 66, and the third wall 68, i.e., the first wall 64, the second wall 66, and the third wall 68 define outer boundaries of the track 54. At least one of the first wall 64, second wall 66, and third wall 68 are connected to the frame 14, e.g., connected directly to the frame 14. The first wall 64, second wall 66, and third wall 68 are fixed relative to each other, i.e., do not move relative to each other.

The first wall 64 of the track 54 extends from the second wall 66 to the third wall 68. Specifically, the second wall 66 may be spaced from the third wall 68 and define a channel 70 therebetween. The slider 22 slides along the channel 70 between the deployed position and the undeployed position.

The deployment assembly 60 includes an actuator 62 to move the slider 22 relative to the frame 14 between the deployed position and the undeployed position. In the example shown in the Figures, the actuator 62 includes a motor 72. The motor 72 between the frame 14 and the slider 22. In the example shown in the Figures, the motor 72 is fixed to the track 54, which is fixed to the frame 14, and the motor 72 moves the slider 22 between the deployed position and the undeployed position.

Specifically, the motor 72 is operatively coupled to the slider 22 to move the slider 22 between the deployed position and the undeployed position. In the example shown in the Figures, the actuator 62 includes a gate 74 and the motor 72 moves the gate 74 from a raised position to a lower position which moves the slider 22 between the deployed position and the undeployed position. Specifically, the gate 74 includes an angled surface 76 and the slider 22 includes an angled surface 78 abutting the angles surface of the gate 74. The abutment of the angled surfaces 76, 78 transmits movement of the gate 74 between the raised position and the lowered position to movement of the slider 22 along the track 54.

The deployment assembly 60 may include at least one spring 80 that biases the slider 22 toward the undeployed position. Specifically, the spring 80 is between the slider 22 and the frame 14. For example, the spring 80 extends from the second wall 66 of the track 54 to the slider 22. The spring 80 may be in the channel 70 of the gate 74. In the example shown in the Figures, the spring 80 is shown as a coil spring and in other examples may be of any suitable type. The spring 80 is designed, i.e., positioned, sized, shaped, to bias the slider 22 toward the undeployed position at all positions of the slider 22.

The actuator 62 of the deployment assembly 60 may include a rack 82 and a pinion 84 that transfers movement of the motor 72 to movement of the gate 74, which moves the slider 22 as discussed above. In the example shown in the Figures, the rack 82 is fixed to the gate 74 and the pinion 84 is on the motor 72. The motor 72 rotates the pinion 84 to linearly move the rack 82, which moves the gate 74 between the raised position and the lowered position.

The motor 72 may be of any suitable type, e.g., a DC motor. The motor 72 is rotatable in two directions to raise and lower the gate 74, as described above. The motor 72 is fixed relative to, i.e., immoveable relative to, the frame 14. Specifically, as set forth above, the motor 72 is connected to the track 54.

The seatbelt retractor 12 includes the locking device 26 operatively coupled between the spool 16 and the post 24 to engage the spool 16 with the post 24. As shown in FIG. 2, the locking device 26 may be supported at the second end 20 of the spool 16 and the second plate 44 of the frame 14. The spool 16 may be between the return spring 46 and the locking device 26 along the axis A1. The locking device 26 is movable from an unlocked position, shown in FIG. 2, in which torque is not transferred from the spool 16 to the post 24 to a locked position, shown in FIG. 3, is which torque is transferred from the spool 16 to the post 24. Specifically, in the unlocked position, the spool 16 rotates relative to the gear 48 and in the locked position the spool 16 rotates as a unit with the gear 48.

The locking device 26 may be lockable with the gear 48. Specifically, the locking device 26 is fixed to and rotates with the spool 16 when the locking device 26 is unlocked with the gear 48. When locked with the gear 48, the locking device 26 couples the gear 48 and the spool 16 so that the gear 48 and the spool 16 rotate together as a unit. The locking device 26 may include an inertia clutch that move the locking device 26 from the unlocked position to the locked position in response to a vehicle 10 deceleration of the inertia clutch from deceleration of the vehicle 10. The inertia clutch may be supported by the spool 16 and lockable with the gear 48. For example, the inertia clutch may include one or more pawls 86 supported at the second end 20 of the spool 16. Centrifugal force from an increase in rotation speed of the spool 16, e.g., when a certain load is applied to the webbing 28, may urge the pawls 86 radially outward to the locked position. As another example, the locking device 26 may be moved from the unlocked position to the locked position in response to deceleration of the vehicle 10, e.g., a sudden slowing of the vehicle 10, sudden stop, impact, etc., of the vehicle 10. The locking device 26 may be moved from the unlocked position to the locked position in response to an activation sensor (not shown). The activation sensor senses sudden deceleration of the vehicle 10 and triggers activation of the locking device 26, i.e., moves the locking device 26 to the locked position. The locking device 26 may include any suitable structure for selectively transferring torque, e.g., including conventional structures. The locking device 26 is resettable. In other words, the locking device 26 may be unlocked from the gear 48, e.g., when the inertia clutch is released, to allow the spool 16 to rotate freely relative to the gear 48. The locking device 26 may be of the type known in the art.

As set forth above, the retractable-gear 48 assemblies are moveable between the deployed position and the undeployed position based on occupant size and/or crash severity. As an example, the vehicle 10 may include at least one occupancy sensor. The occupancy sensor configured to detect occupancy of the vehicle seats 34. In some examples, the occupancy sensor may determine the size of an occupant seated on an occupant-seating area, etc. In other examples, the occupancy sensor may communicate data to a computer of the vehicle 10, described below for use by the computer to identify the size of the occupant.

As examples, the occupancy sensor may be visible-light or infrared cameras directed at the vehicle 10 seat 34, weight sensors supported by the seat 34 bottom, sensors detecting whether a seatbelt assembly 36 for the seat 34 is buckled, sensors detecting the amount of webbing 28 paid out of the retractor when buckled, or other suitable sensors. The occupancy sensor provides data to the computer specifying whether the vehicle seat 34 is occupied or unoccupied and/or information regarding the size of occupant.

The vehicle computer may be, for example, a restraints control module The vehicle computer includes a processor and a memory. The memory includes one or more forms of computer readable media, and stores instructions executable by the computer for performing various operations, including as disclosed herein and including. For example, the computer may be a generic computer with a processor and memory as described above and/or may include an electronic control unit ECU or controller for a specific function or set of functions, and/or a dedicated electronic circuit including an ASIC (application specific integrated circuit) that is manufactured for a particular operation, e.g., an ASIC for processing sensor data and/or communicating the sensor data. In another example, the computer may include an FPGA (Field-Programmable Gate Array) which is an integrated circuit manufactured to be configurable by a user. Typically, a hardware description language such as VHDL (Very High-Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically connected to the FPGA circuit. In some examples, a combination of processor(s), ASIC(s), and/or FPGA circuits may be included in the computer. The memory may be of any type, e.g., hard disk drives, solid state drives, servers, or any volatile or non-volatile media. The memory may store the collected data sent from the sensors, including the occupancy sensor. The memory may be a separate device from the computer, and the computer may retrieve information stored by the memory via a vehicle 10 communication network, e.g., over a CAN bus, a wireless network, etc. Alternatively or additionally, the memory may be part of the computer, e.g., as a memory of the computer.

The computer is generally arranged for communications on the vehicle 10 communication network that may include a bus in the vehicle 10 such as a controller area network CAN or the like, and/or other wired and/or wireless mechanisms. Alternatively or additionally, in cases where the computer includes a plurality of devices, the vehicle communication network may be used for communications between devices represented as the computer in this disclosure. Further, as mentioned below, various controllers and/or sensors may provide data to the computer via the vehicle communication network.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A seatbelt retractor comprising:
   a frame;
   a spool having a first end and a second end each rotatably supported by the frame, the spool being elongated along an axis from the first end to the second end;
   a slider slidably engaged with the frame, the slider being slidable from an undeployed position to a deployed position;
   a post supported by the slider and moveable with the slider between the undeployed position and the deployed position, the post being engaged with the spool in the deployed position and disengaged with the spool in the undeployed position; and
   a locking device operatively coupled between the spool and the post to engage the spool with the post.

2. The seatbelt retractor of claim 1, further comprising a motor between the frame and the slider, the motor being operatively coupled to the slider to move the slider between the deployed position and the undeployed position.

3. The seatbelt retractor of claim 1, wherein the post has an end proximate to the slider and fixed relative to the slider.

4. The seatbelt retractor of claim 1, further comprising a second post fixed relative to the frame in a position engaged with the spool.

5. The seatbelt retractor of claim 4, wherein the post and the second post are spaced from each other circumferentially about the axis.

6. The seatbelt retractor of claim 4, wherein the second post has an end proximate to the frame and fixed relative to the frame.

7. The seatbelt retractor of claim 1, further comprising a track between the frame and the slider, the slider sliding along the track relative to the frame between the deployed position and the undeployed position.

8. The seatbelt retractor of claim 1, wherein the post is plastically deformable relative to the frame in the deployed position during rotation of the spool relative to the frame.

9. The seatbelt retractor of claim 1, further comprising a gear coaxial with the spool and rotatably supported by the frame, the locking device being lockable with the gear.

10. The seatbelt retractor of claim 9, wherein the locking device includes an inertia clutch supported by the spool and lockable with the gear.

11. The seatbelt retractor of claim 9, further comprising teeth on the gear and teeth on the post, the teeth on the post being engaged with the teeth on the gear in the deployed position and disengaged with the teeth on the gear in the undeployed position.

12. The seatbelt retractor of claim 11, further comprising a second post and teeth on the second post, the second post being fixed to the frame in a position with the teeth on the second post engaged with the teeth on the gear.

13. The seatbelt retractor of claim 12, wherein the post and the second post are spaced circumferentially around the gear.

14. The seatbelt retractor of claim 11, further comprising a motor between the frame and the slider, the motor being operatively coupled to the slider to move the slider between the deployed position and the undeployed position.

15. The seatbelt retractor of claim 1, further comprising a webbing wound around the spool.

16. The seatbelt retractor of claim 1, further comprising a spring between the slider and the frame, the spring biasing the slider toward the undeployed position.

* * * * *